United States Patent [19]
James, Jr. et al.

[11] Patent Number: 5,088,470
[45] Date of Patent: Feb. 18, 1992

[54] ACCESS WINDOW FOR BARBECUE GRILLS

[75] Inventors: Charles W. James, Jr.; James R. Carden; William E. Kirkland, all of Columbus, Ga.

[73] Assignee: W.C. Bradley Company, Columbus, Ga.

[21] Appl. No.: 661,177

[22] Filed: Feb. 27, 1991

[51] Int. Cl.⁵ .......................... A47J 37/00; F24C 3/00
[52] U.S. Cl. .................. 126/41 R; 126/25 R; 126/194; 126/200
[58] Field of Search ........... 126/25 R, 41 R, 190–199, 126/200, 273, 21 R, 21 A, 37 R; 99/339, 340, 401, 446, 447, 393, 341

[56] References Cited

U.S. PATENT DOCUMENTS

| | | | |
|---|---|---|---|
| 2,568,022 | 9/1951 | Parker | 126/25 R |
| 2,748,691 | 6/1956 | Johnson | 126/25 R |
| 3,049,073 | 8/1962 | Edelston | 126/275 |
| 3,788,300 | 1/1974 | Doner | 126/190 |
| 4,729,364 | 3/1988 | Dailey | 126/200 |
| 4,960,100 | 10/1990 | Pellicane | 126/21 A |

*Primary Examiner*—James C. Yeung
*Attorney, Agent, or Firm*—Hopkins & Thomas

[57] ABSTRACT

An access window for barbecue grills in which the access window is openable for acces to foods being cooked on the grill. The window includes a frame with a hinge associated therewith, the hinge being received by brackets on the grill hood. A handle is also provided for opening and closing the window.

15 Claims, 2 Drawing Sheets

ACCESS WINDOW FOR BARBECUE GRILLS

BACKGROUND OF THE INVENTION

Many types of covered barbecue grills are provided with a glass viewing window in the top or hood portion thereof through which the chef can observe the food being cooked. Such windows are made from tempered or heat-treated glass so as to withstand the extreme temperatures generated during use of the grill.

Viewing windows provide superior performance relative to other types of grills when cooking food on a barbecue grill due to the fact that the chef can better determine when to turn the food over, when to move food to a cooler or hotter area of the cooking grate, when to adjust the shuttering effect provided by a device such as that shown in U.S. Pat. No. 4,703,746, having the same assignee as the present invention, for an Adjustable Shutter Grate for Barbecue Grills, as well as other advantages. One advantage that such windows have not provided, to our knowledge, is the ability to fully open the window to adjust the position of food, to add or remove items from the cooking grate or from a secondary cooking surface such as a warming rack, and to more easily clean the window.

One reference which shows a movable window is U.S. Pat. No. 4,729,364 to Dailey for a Grill with View/Vent Window. As the title implies, this reference shows a viewing window-hinged at its bottom edge to the grill hood. The window pivots slightly outwardly from the hood, creating an opening at the top of the window for providing a chimney or draft effect in an effort to adjust grill temperature and thus, cooking time. No access to the food is provided; however, thus leaving unfulfilled the need in the art for such an advantage.

SUMMARY OF THE INVENTION

It is therefore, one of the principal objects of the present invention to further improve the cooking performance of a barbecue grill, by providing a fully-opening access window for access to the food being cooked without having to raise the hood, thus maintaining a more even cooking temperature.

Another object of the present invention is to add to the ease of cooking on a barbecue grill with a fully opening front panel through which foods can be added or removed without the need to open the hood, thus facilitating staggered cooking times and different tastes.

A further object of the present invention is to facilitate the cleaning of the access window, the window being pivotally mounted to effect a complete reversal of the outward-facing side thereof and to provide an access window assembly that is extremely durable to provide a long service life.

These and other objects are attained by the present invention which relates to an access window for barbecue grills, the window normally being provided in the front portion of the grill hood. The access window includes hinge means at or near the upper edge thereof and handle means at any convenient location, such as a lower or side edge of the window for opening and closing the window. Frame means are provided for mounting the window and may be used for the hinge or hinges, handle, and any other accessories, depending on the particular design of the accessory or part.

Various additional objects and advantages of the present invention will become apparent from the following detailed description, with reference to the accompanying drawings.

DETAILED DESCRIPTION OF THE PREFERRED EMBODIMENT

Figure 1:
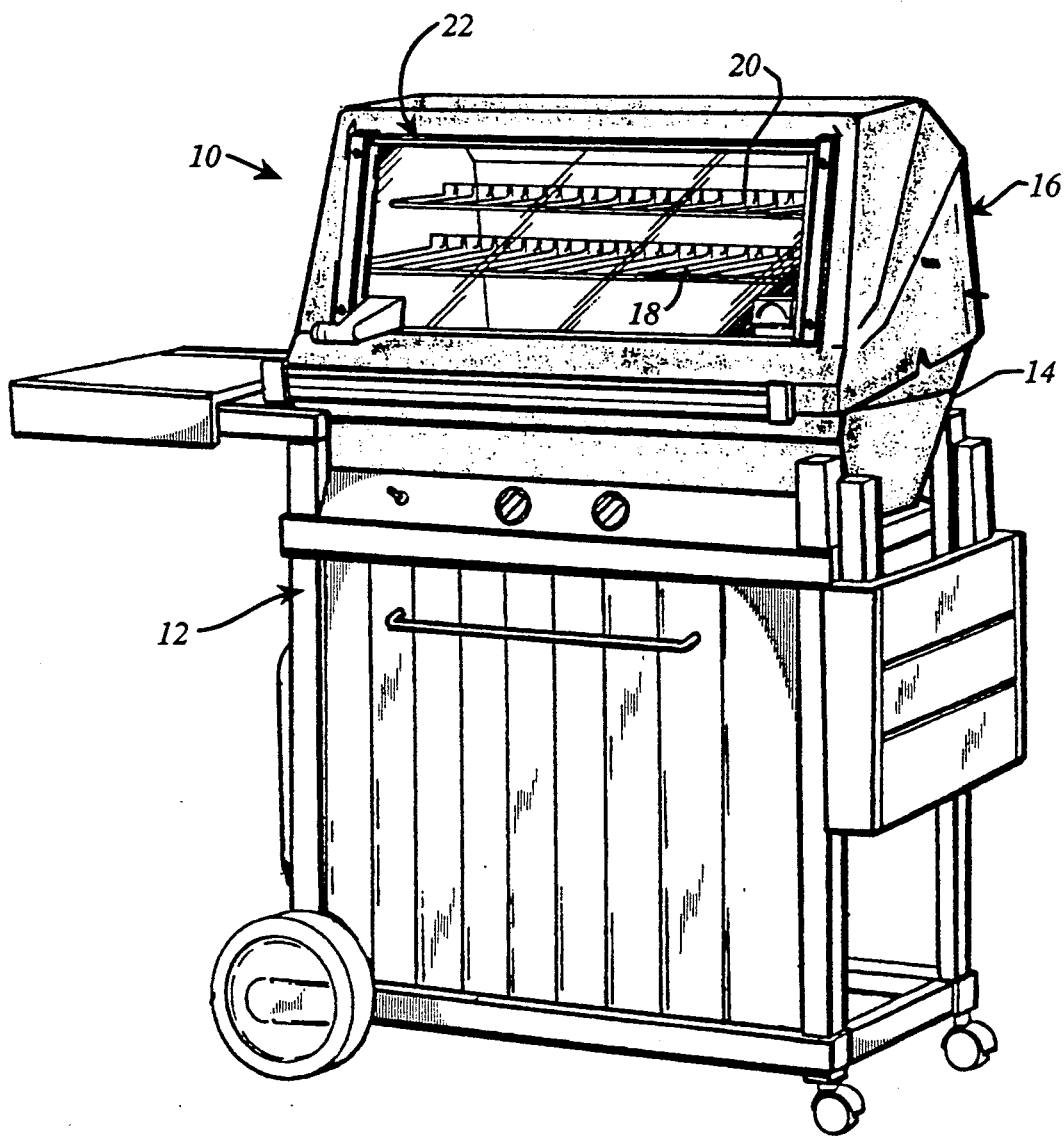
FIG. 1 is a perspective view of a cart-mounted barbecue grill showing the present access window in installed position.
Figure 2:
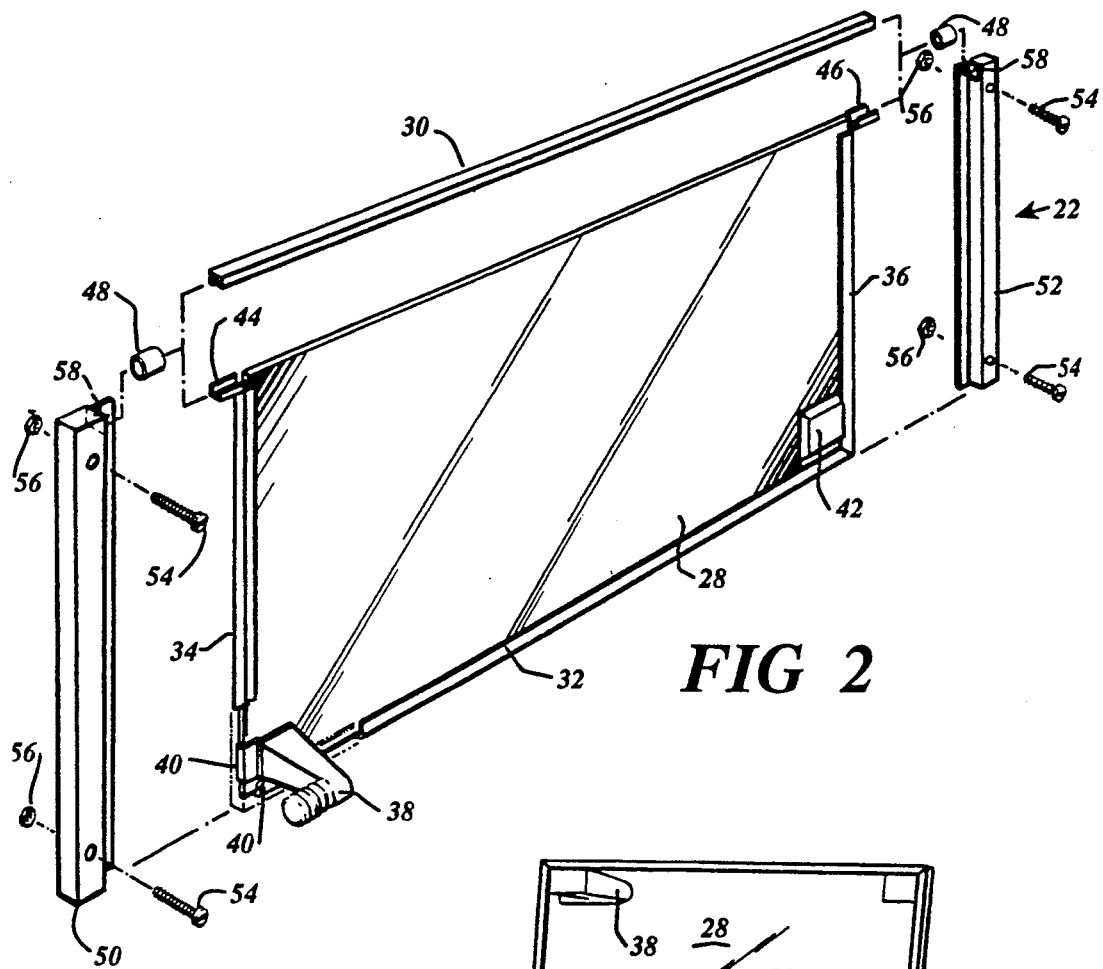
FIG. 2 is an exploded perspective view showing the access window assembly.

Referring now more specifically to the drawings, and to FIG. 1 in particular, numeral 10 designates generally a barbecue grill, which for purposes of this invention, could be gas-fired, electric, or a charcoal-burning model. The grill is shown mounted on a cart 12, with other possible mounting means including fixed posts, or fixed support legs without wheels, among others. The grill 10 includes a lower portion comprising the firebox 14 which normally contains the heating medium, such as a burner or charcoal, and an upper portion or hood 16 which is normally hinged to the firebox along or near the corresponding rear edges.

Temperature regulation in a barbecue grill such as that shown in FIG. 1, is most easily accomplished by leaving the grill hood in the down position while cooking thereon. Temperature control means normally include vents or dampers typically found on charcoal grills, or burner controls, typically found on gas grills, to regulate the amount of gas supplied to the burner. Thus, cooking efficiency is increased the fewer times the hood is opened during the cooking operation to turn or otherwise tend the food being cooked. Grills of the type shown in FIG. 1 typically include one or more secondary cooking surfaces, such as the SWINGAWAY ® warming racks 18 and 20, produced by the W. C. Bradley Co., on which to place foods which are to be slow-cooked, or merely warmed such as hamburger buns and the like. Such secondary cooking surfaces, being spaced from the main cooking grid, receive less direct heat from the burner or charcoal, but do receive considerable heat from the hot gases above the main cooking grid. Thus, even though these cooking surfaces are secondary, food placed thereon must be tended.

Figure 3:
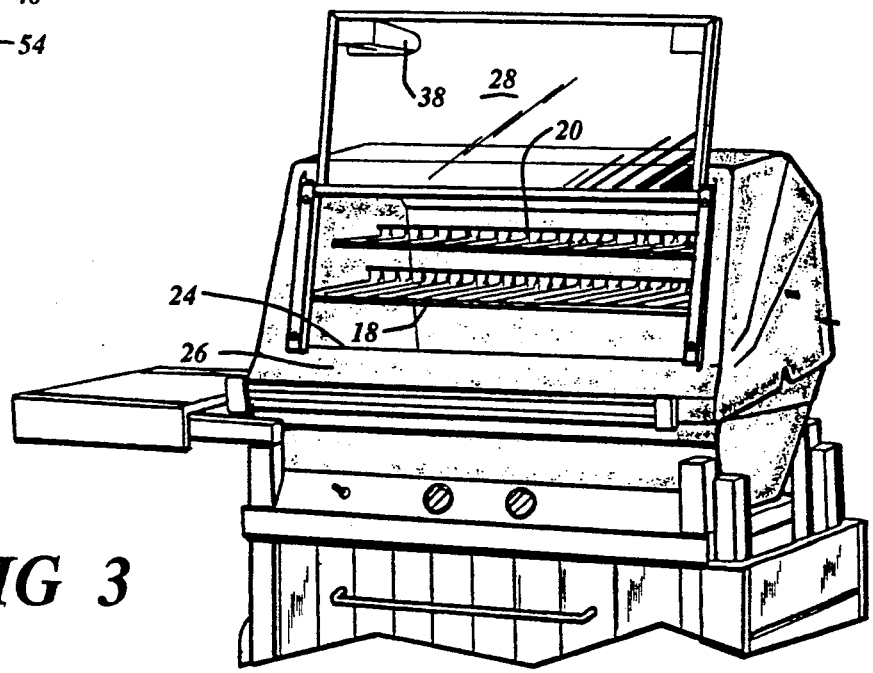
FIG. 3 is a partial perspective view with the present access window in installed position on the grill, illustrating the open position of the window.

The present invention addresses these problems of temperature regulation and the need to tend the food being cooked on the grill by providing a fully opening access and viewing window assembly 22. The closed position of the window assembly 22 is shown in FIG. 1 while the open position is shown in FIG. 3. The hood 16 is formed with a generally rectangular opening 24 in the front wall 26 thereof, over which the window assembly is disposed. The front wall of the hood is disposed at an angle from the vertical, the uppermost portion of the front wall being disposed further toward the rear of the grill than the lowermost portion of the front wall. Thus, when in a closed position, the window assembly is biased toward the front wall of the hood, as seen in FIG. 1, due to its slanted configuration. When in an open position, as shown in FIG. 3, the window assembly is biased to remain so due to its alignment in relatively the same plane as the rearwardly slanted front wall. The window assembly thus normally has a range of movement of approximately one hundred eighty degrees (180°) but the range may be more or less depending on the configuration of the grill hood. In addition, stop means (not shown) such as detents may be added along with a brace or prop (not shown) to hold the window assembly in a selected position.

The window assembly 22 includes a transparent panel means such as tempered glass 28. Surrounding the glass are top, bottom, left and right generally U-shaped frame members 30, 32, 34 and 36 respectively, the edges of the glass being received in the channels. Mounted near the left bottom edge of the glass panel is a heat-resistant handle means 38. The handle means has a pair of outwardly extended, generally U-shaped channel means 40 which receive portions of the edge of the window therein and are then covered by the corresponding frame members to secure the handle in place. While shown in the lower left, the handle could be mounted on the opposite side, along the right or left side, or in any other convenient location. Similarly, a temperature gauge 42 is shown mounted near the lower right side of the window in a manner similar to that of the handle. The position of the temperature gauge may also be changed if necessary or desirable.

Extending outwardly and generally perpendicular to each of the left and right side frame members are shaft means or hinges 44 and 46 respectively which are lateral extensions of the frame members. These shafts and the outer end portions of top frame member 30 are received within bushings 48 which are then received within left and right side support brackets 50 and 52 respectively, thus creating a suitable hinge means. The support brackets are secured to the grill hood on each side of the front opening 24 therein with suitable securing means such as bolts 54 and nuts 56. The framed window is pivotally mounted over the opening 24 by engaging bushings 48 in sockets 58, the sockets being provided in each of the support brackets 50 and 52, near or at the upper ends thereof.

The bushings are rotatable within their respective sockets to allow the window to pivot between the closed position of FIG. 1 and the open position of FIG. 3. As readily appreciated from FIG. 3, food which is being cooked or warmed on either warming rack 18 or 20 or, depending on the particular grill design, on the main cooking grid (not shown) can easily be accessed by way of the open window. In addition, while not illustrated, it will also be readily appreciated that the present invention would greatly facilitate basting of food being cooked on a rotisserie. These and other advantages have heretofore not been available with such appliances and it is believed apparent that the versatility of the applicances is greatly increased. It will also be apparent to those skilled in the art that the concept may also be used with other cooking appliances, such as ovens, toasters ovens, and the like.

Thus, while an embodiment of an access window for barbecue grills and modifications thereof have been shown and described in detail herein, various additional changes and modifications may be made without departing from the scope of the present invention.

We claim:

1. An access window assembly for barbecue grills in which the barbecue grill includes a hood portion with an opening formed therein and said window assembly has open and closed positions, said window assembly comprising a transparent panel means sized to substantially cover said opening in said hood portion, frame means disposed around said panel means and having hinge means disposed near the upper portion of said panel means, said hinge means being formed from a lateral extension of said frame means on each side of said panel means and bracket means on said hood portion for pivotally receiving said hinge means and allowing said panel means to move between open and closed positions.

2. An access window assembly as defined in claim 1 in which said assembly includes a handle means for moving said panel means between open and closed positions.

3. An access window assembly as defined in claim 1 in which said hinge means includes bushings secured to said frame means and extending laterally in opposite directions, and in which said bracket means include sockets for rotatably receiving said bushings.

4. An access window assembly as defined in claim 1 in which said open position and said closed position of said panel means are at least one hundred and eighty degrees apart.

5. An access window for use in a cooking appliance having a means of entry for gaining access to food being cooked therein, and in which said means of entry includes an opening formed therein, said window comprising a transparent panel means of a size sufficient to substantially cover said opening, hinge means associated with said panel means and means associated with said means of entry for receiving said hinge means for allowing said panel means to travel between open and closed positions and a frame means disposed around said panel means, said frame means including side members having lateral extensions projecting radially from said side members in opposite directions and a top frame member, said top frame member and said lateral extensions together forming said hinge means.

6. An access window as defined in claim 5 and including a handle means for moving said panel means between open and closed positions.

7. An access window as defined in claim 5 and including a handle means for moving said panel means between open and closed positions.

8. An access window as defined in claim 5 in which said means associated with said means of entry include brackets secured to said means of entry, said brackets having sockets for receiving said hinge means.

9. An access window as defined in claim 8 in which said hinge means include shafts with bushings disposed therearound and extending away from said panel means and being received in said sockets.

10. In a barbecue grill of the type having a lower firebox portion and an upper hood portion for covering the firebox and in which the hood portion includes an opening that is normally covered by a viewing window for observation of the food being cooked wherein the improvement comprises an openable access window assembly for replacing said viewing window, said assembly including a substantially transparent panel means having a frame and being sized to substantially cover said opening in said hood portion, hinge means formed from said frame and having right and left side members extending laterally and in opposite directions from one another and from said panel means, and a top member extending between said side members for interconnecting said side members, and means for receiving said hinge means on said hood portion such that said panel means is movable between open and closed positions.

11. An access window assembly as defined in claim 10 and including a handle means for moving said panel means between open and closed positions.

12. An access window assembly as defined in claim 10 and including a handle means for moving said panel means between open and closed positions.

13. An access window assembly as defined in claim 10 in which said means for receiving include brackets secured to said hood portion, said brackets having sockets for receiving said hinge means.

14. An access window assembly as defined in claim 13 in which said hinge means include shafts extending away from said panel means and being received in said sockets.

15. An access window assembly as defined in claim 14 in which said assembly includes bushings disposed around said shafts and received within said sockets.

* * * * *